US007996655B2

(12) United States Patent
Luick

(10) Patent No.: US 7,996,655 B2
(45) Date of Patent: Aug. 9, 2011

(54) MULTIPORT EXECUTION TARGET DELAY QUEUE FIFO ARRAY

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 12/107,289

(22) Filed: Apr. 22, 2008

(65) Prior Publication Data
US 2009/0265527 A1 Oct. 22, 2009

(51) Int. Cl.
G06F 9/30 (2006.01)
G06F 9/40 (2006.01)
G06F 15/00 (2006.01)

(52) U.S. Cl. ........................................ 712/218; 712/216
(58) Field of Classification Search .................... 712/218
See application file for complete search history.

(56) References Cited

U.S. PATENT DOCUMENTS
6,985,150 B2 * 1/2006 Deering ........................ 345/506
7,003,649 B2 * 2/2006 Krishnan ...................... 712/213
2003/0154364 A1 * 8/2003 Peng et al. .................... 712/218
2006/0149930 A1 * 7/2006 Murakami et al. ............ 712/218
2007/0186080 A1 * 8/2007 Luick ............................ 712/214

OTHER PUBLICATIONS

Shen; Modern Processor Design: Fundamentals of Superscalar Processors; 2002; McGraw Hill.*

* cited by examiner

Primary Examiner — Eddie Chan
Assistant Examiner — Corey Faherty
(74) Attorney, Agent, or Firm — Patterson & Sheridan LLP

(57) ABSTRACT

One embodiment provides a method of forwarding data in a processor. The method generally includes providing at least one cascaded delayed execution pipeline unit having at least a first pipeline and a second pipeline for executing first and second instructions in a common issue group, wherein the second pipeline executes the second instruction in a delayed manner relative to the execution of the first instruction in the first pipeline, storing results generated by an execution unit of the first pipeline in a first-in first-out (FIFO) storage target delay queue, determining if the target delay queue contains source data for executing the second instruction, and if the target delay queue contains source data for the second instruction, forwarding the source data for the second instruction from the target delay queue to an execution unit of the second pipeline.

5 Claims, 11 Drawing Sheets

MULTIPORT EXECUTION TARGET DELAY QUEUE FIFO ARRAY

BACKGROUND OF THE INVENTION

1. Field of the Invention

The present invention generally relates to executing instructions in a processor.

2. Description of the Related Art

In conventional processors, it is often beneficial to immediately use the result of an execution unit or a load/store unit as a source operand for the next instruction without waiting for the result to be first written into a common register file. This is called result forwarding. However, to implement result forwarding, the inputs of each unit in a processor must be connected to every other unit in the processor. Also, because instructions may be executed one or more cycles apart, the register data may be temporarily stored, e.g., in latches.

Unfortunately, for a processor containing multiple pipelines, the size of the interconnections and storage circuitry may become prohibitive.

SUMMARY OF THE INVENTION

One embodiment provides a method of forwarding data in a processor. The method generally includes providing at least one cascaded delayed execution pipeline unit having at least a first pipeline and a second pipeline for executing first and second instructions in a common issue group, wherein the second pipeline executes the second instruction in a delayed manner relative to the execution of the first instruction in the first pipeline, storing results generated by an execution unit of the first pipeline in a first-in first-out (FIFO) storage target delay queue, determining if the target delay queue contains source data for executing the second instruction, and if the target delay queue contains source data for the second instruction, forwarding the source data for the second instruction from the target delay queue to an execution unit of the second pipeline.

One embodiment provides a processor. The processor generally includes at least one cascaded delayed execution pipeline unit having at least a first pipeline and a second pipeline for executing first and second instructions in a common issue group, wherein the second pipeline executes the second instruction in a delayed manner relative to the execution of the first instruction in the first pipeline, at least a first first-in first-out (FIFO) storage target delay queue for storing results generated by an execution unit of the first pipeline, and forwarding logic for determining if the target delay queue contains source data for executing the second instruction and, if so, forwarding the source data for the second instruction from the target delay queue to an execution unit of the second pipeline.

One embodiment provides a processor. The processor generally includes at least one cascaded delayed execution pipeline unit having at least first second, and third pipelines that execute first, second, and third instructions, respectively, in a delayed manner relative to each other, at least first and second first first-in first-out target delay queue (TDQs) in which results from the execution of instructions in the first and second pipelines are stored, and forwarding circuitry configured to determine if either or both of the first and second target delay queues contain source data for the third instructions by the third pipeline unit and, if so, forward the source data from the target delay queue to an execution unit of the second or third pipeline, respectively.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4 is a block diagram depicting the format of exemplary instructions executed by the processor according to one embodiment of the invention.

DETAILED DESCRIPTION OF THE PREFERRED EMBODIMENTS

The present invention generally provides a method and apparatus for forwarding data in a processor. In one embodiment, the method includes providing at least one cascaded delayed execution pipeline unit having a first pipeline and a second pipeline, wherein the second pipeline executes instructions in a common issue group in a delayed manner relative to the first pipeline. The method also includes determining if a first instruction being executed in the first pipeline modifies data in a data register which is accessed by a second instruction being executed in the second pipeline. If the first instruction being executed in the first pipeline modifies data in the data register which is accessed by the second instruction being executed in the second pipeline, the modified data is forwarded from the first pipeline to the second pipeline. In some cases, because of the delayed, cascaded design of the pipeline unit, the number of forwarding paths in a pipeline unit may be reduced with respect to other pipeline units which do not utilize cascaded, delayed execution.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Overview of an Exemplary System

Figure 1:
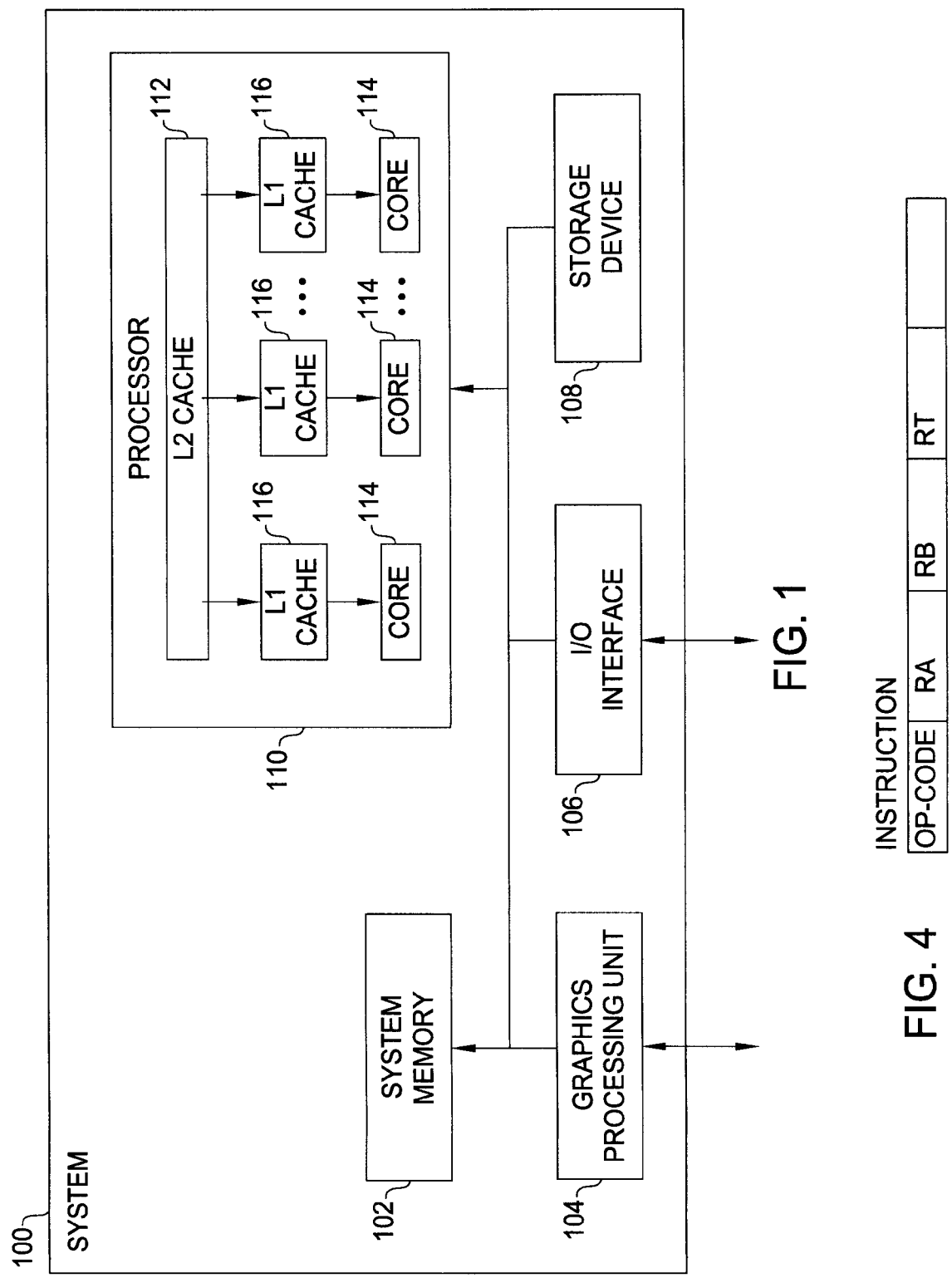
FIG. 1 is a block diagram depicting a system according to one embodiment of the invention.

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
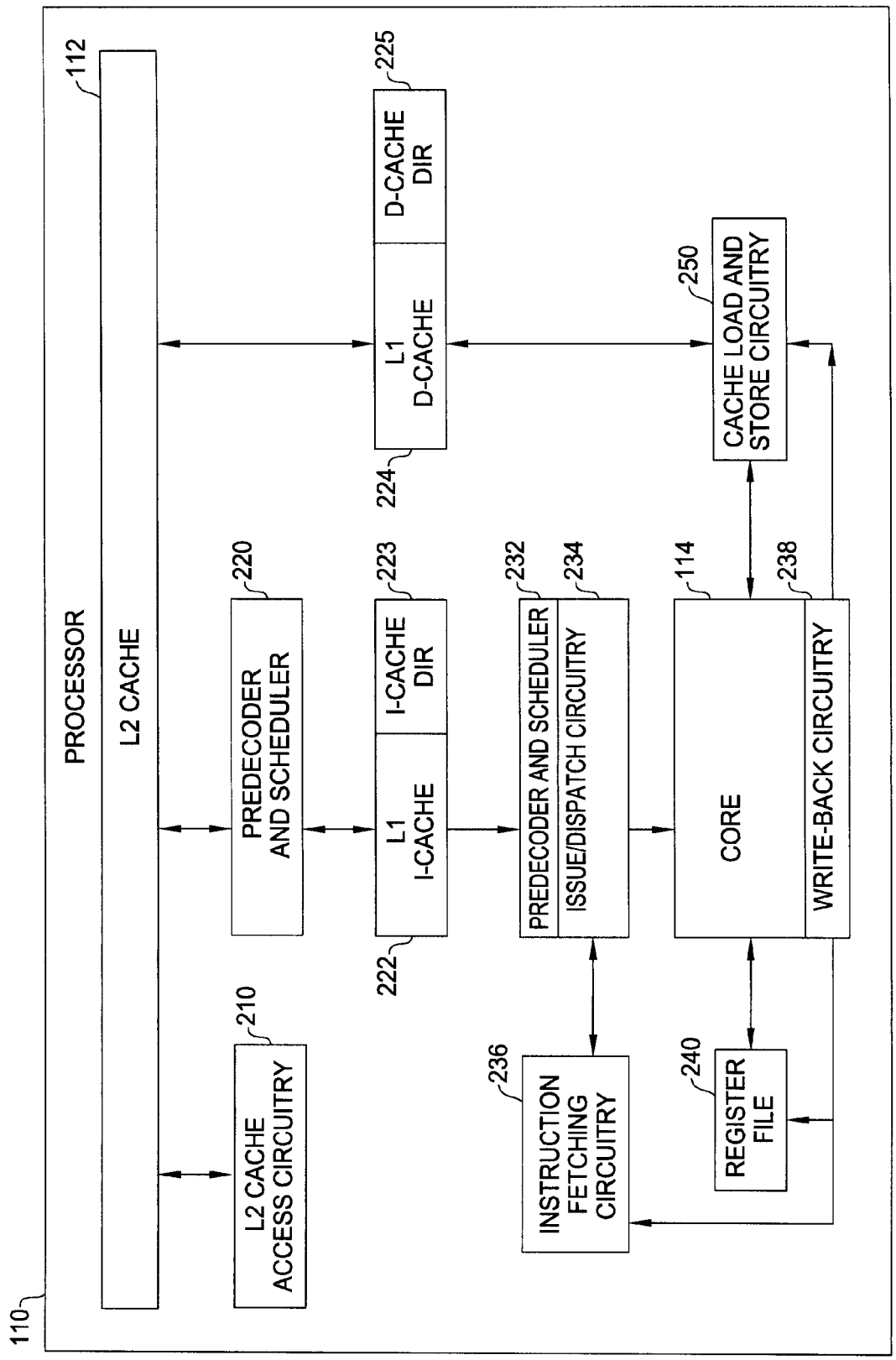
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220 (described below in greater detail).

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. In some cases, the predecoder and scheduler 220 may be shared among multiple cores 114 and L1 caches. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core. A branch unit within the core may be used to change the program counter when a branch instruction is encountered. An I-line buffer 232 may be used to store instructions fetched from the L1 I-cache 222. Issue and dispatch circuitry 234 may be used to group instructions retrieved from the I-line buffer 232 into instruction groups which may then be issued in parallel to the core 114 as described below. In some cases, the issue and dispatch circuitry may use information provided by the predecoder and scheduler 220 to form appropriate instruction groups.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file 240, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Figure 3:
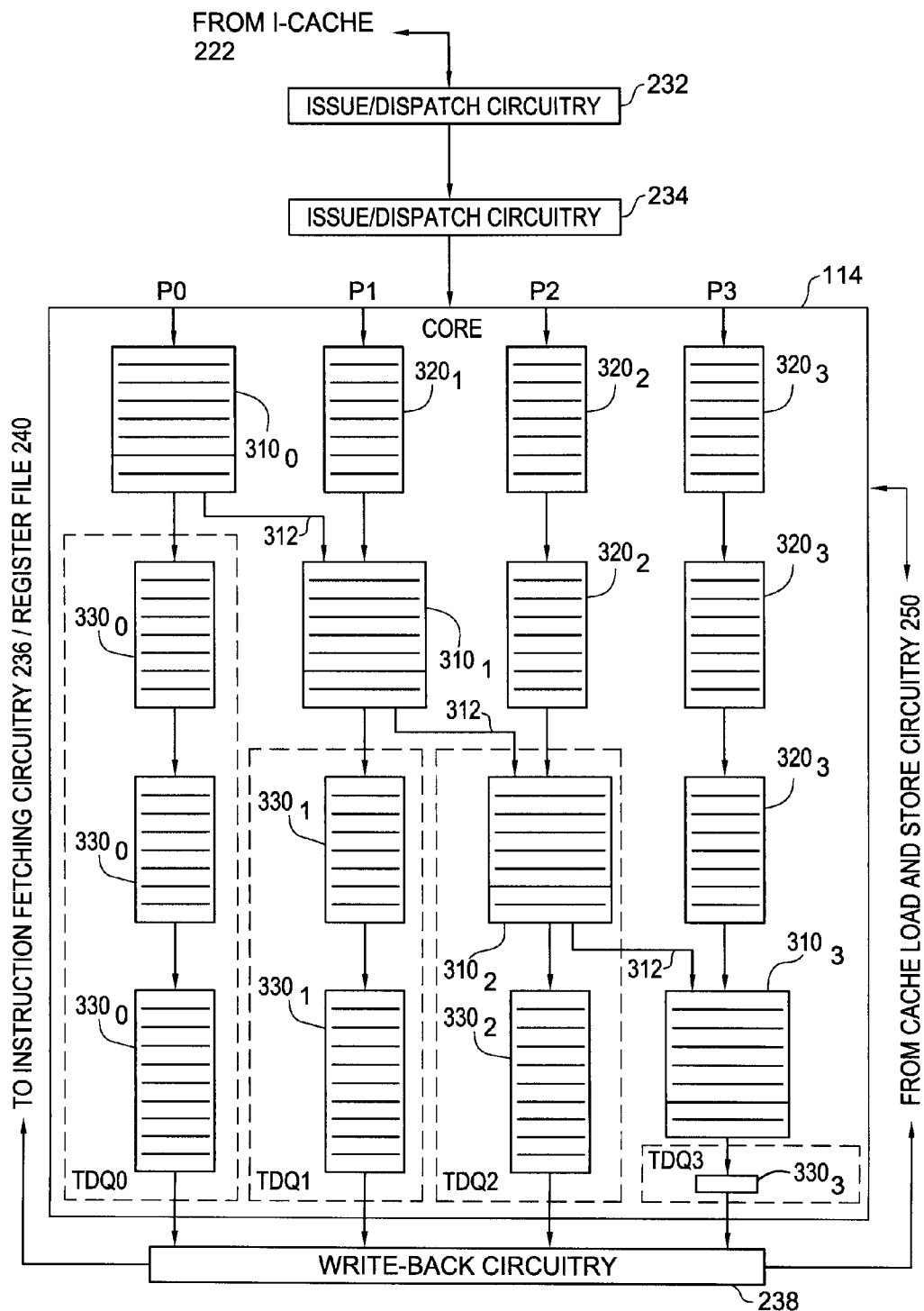
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit 310 may be shared with a predecoder and scheduler 220 which is shared among multiple cores 114 or, optionally, which is utilized by a single core 114. The execution unit 310 may also read data from a register file 240, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In one embodiment, upon issuing the issue group to the processor core 114, may be executed immediately in execution unit $310_0$. Later, after instruction I0 has finished being executed in execution unit $310_0$, execution unit $310_1$ may begin executing instruction I1, and so one, such that the instructions issued in parallel to the core 114 are executed in a delayed manner with respect to each other. Also, in one embodiment, some execution units 310 may be delayed with respect to each other while other execution units 310 are not delayed with respect to each other.

In one embodiment, instructions which are not being executed by an execution unit 310 (e.g., instructions being delayed) may be held in a delay queue 320. The delay queues 320 may be used to hold instructions in an instruction group which have not been executed by an execution unit 310. For example, while instruction I0 is being executed in execution unit $310_0$, instructions I1, I2 and I3 may be held in a delay queue 320. Once the instructions have moved through the delay queues 320, the instructions may be issued to the appropriate execution unit 310 and executed. The target delay queues 330 may be used to hold the results of instructions which have already been executed by an execution unit 310. For example, an instruction executed in a first execution unit 310 for a given pipeline may modify register data. Before the modified register data is written back by the write-back circuitry 238, the register data may be stored in the target delay queue 330. In some cases, results in the target delay queues 330 may be forwarded to executions units 310 for processing or invalidated where appropriate.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 238 may be used to write back the most recently modified value of a register (received from one of the target delay queues 330) and discard invalidated results.

An Exemplary Instruction

FIG. 4 is a block diagram depicting the format of an exemplary instruction executed by the processor according to one embodiment of the invention. As depicted, a first instruction may contain an operation code (op-code) identifying the type of instruction, a first source register designation (Register A, or RA), a second source register designation (Register B, or RB), and a target register (RT). The op-code may, for example, identify an arithmetic operation to be performed with the contents of a first register identified by RA and a second register identified by RB. The result of the arithmetic operation may then be placed in a third register identified by RT. As known to those skilled in the art, instructions may also be provided in other formats which, for example, do not require a register designation, provide a single register designation (e.g., as a source or a target), provide two register designations (e.g., as a source and a target), or provide more than three register designations.

Providing Forwarding Paths in a Delayed Execution Pipeline

As described above, in one embodiment of the invention, the cascaded delayed execution pipeline unit may include at least a first pipeline and a second pipeline. When a common issue group of instructions are issued to the pipeline unit, the second pipeline may execute instructions in the common issue group in a delayed manner relative to the first pipeline. In some cases, a first instruction being executed in the first pipeline may modify data in a data register which is accessed by a second instruction being executed in the second pipeline. In order to provide the second instruction with the modified data quickly, for example, before the modified data has been written back to the register file 240 or to a target delay queue 330, the data may be forwarded from the first pipeline to the second pipeline. In some cases, the forwarded data may be received in the second pipeline one or two clock cycles after the data was modified by the first instruction in the first pipeline. Also, as described below, because of the delayed, cascaded design of the pipeline unit, the number of forwarding paths in a pipeline unit may be reduced with respect to other cores which do not utilize cascaded, delayed execution.

Figure 5A:
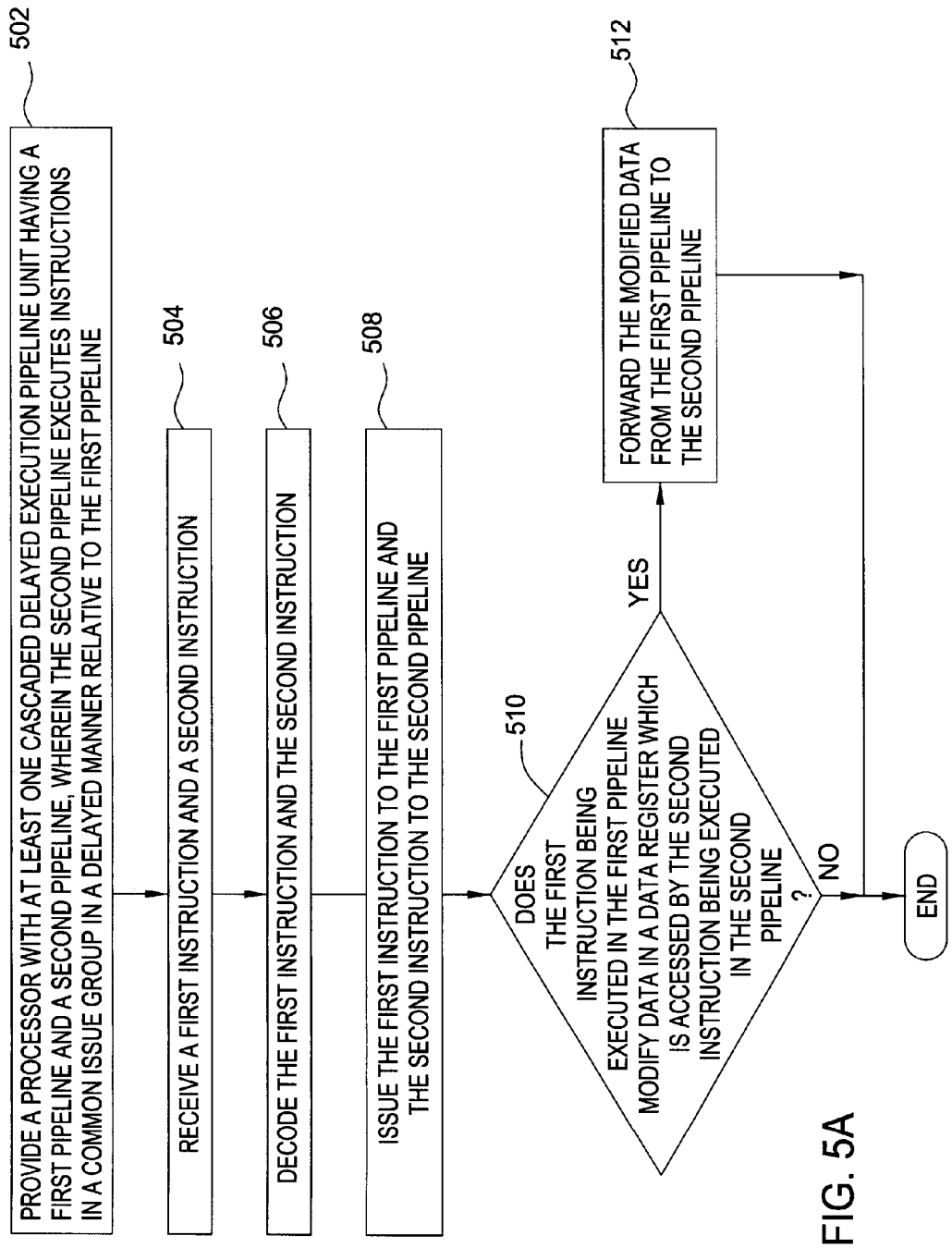
FIGS. 5A-5B are a flow diagram depicting a process for forwarding register data in a processor according to one embodiment of the invention.

FIG. 5A is a flow diagram depicting a process 500 for forwarding data in a delayed execution pipeline according to one embodiment of the invention. As depicted, the process 500 may begin at step 502 where a processor with at least one cascaded, delayed execution pipeline is provided. The cascaded, delayed execution pipeline may include a first pipeline and a second pipeline, and the second pipeline may be configured to execute instructions in a common issue group in a delayed manner relative to the first pipeline.

At step 504, a first instruction and second instruction may be received, for example, from the L2 cache 112. At step 506, the first instruction and the second instruction 506 may be decoded, for example, using the predecoder and scheduler 220. Then, at step 508, the first instruction may be issued to the first pipeline and the second instruction may be issued to the second pipeline (e.g., after being placed in the L1 I-cache 222 and issued by the issue and dispatch circuitry 234).

At step 510, a determination may be made of whether the first instruction modifies data in a data register which is also accessed by the second instruction. The determination may be made, for example, using circuitry which determines which location in the processor 110 contains the most recently updated version of the register data (e.g., the register file 240, a target delay queue 330, or one of the execution units 310 which may provide the data via a forwarding path). The circuitry may also utilize information derived during decoding (e.g., by the predecoder and scheduler 220), such as information about instruction dependencies, to determine whether to perform forwarding. If a determination is made that the first instruction modifies data in a data register which is also accessed by the second instruction, then the modified data may be forwarded from the first pipeline to the second pipeline at step 512. As described below, the data may be forwarded between the first and second pipeline via a forwarding path between the pipelines. Furthermore, in some cases, the forwarding may be performed without stalling execution of the second instruction (e.g., by inserting no-ops in the second pipeline before the second instruction).

As mentioned above, in some cases, register data for a given register may be available from multiple sources including the register file 240, a target delay queue 330, or from another pipeline via a forwarding path. Furthermore, embodiments of the invention may provide multiple types of forwarding paths. For example, in one embodiment of the invention, the processor 110 may provide hot forwards and warm forwards. Hot forwards may refer to forwards which provide modified register data from a given pipeline within one cycle of the register data being modified (e.g., if the register data is modified in cycle one, then the register data may be provided via a forwarding path to a pipeline in cycle two). Warm forwards may refer to forwards which provide modified register data from a given pipeline within two cycles of the register data being modified (e.g., if the register data is modified in cycle one, then the register data may be provided via a forwarding path to a pipeline in cycle three). Where modified register data is retrieved from another location such as a target delay queue 330 after three or more cycles, the forward may be referred to as a cold forward.

Figure 5B:
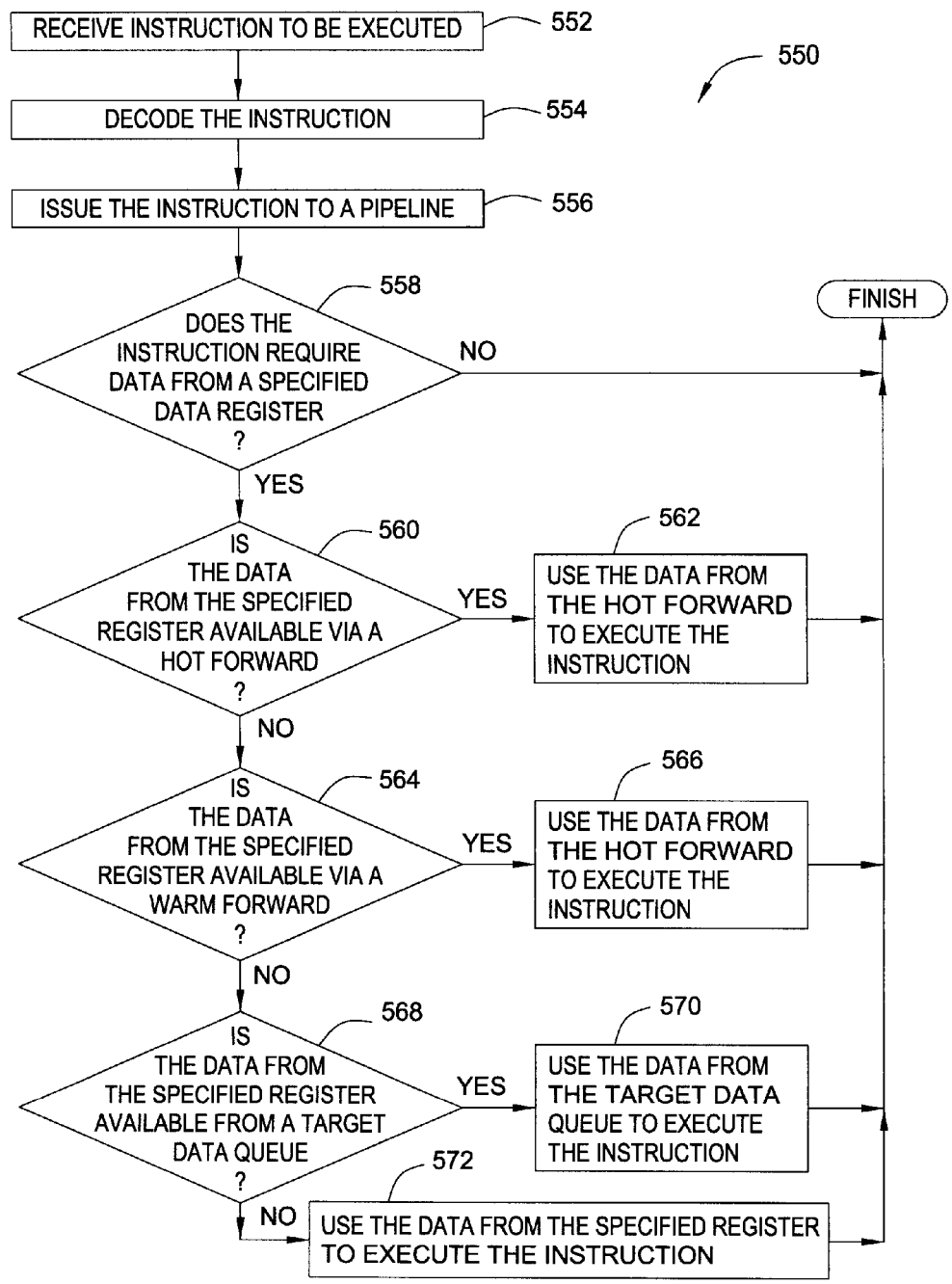

FIG. 5B is a flow diagram depicting a process 550 for determining which data to use for an instruction according to one embodiment of the invention. As depicted, the process may begin at step 552 where an instruction to be executed is received. At step 554 the instruction may be decoded and at step 556 the instruction may be issued to a pipeline for execution. At step 558, a determination may be made of whether the instruction requires data from a specified data register. If the instruction does not require data from a data register, there may not be a need to check for possible sources of register data, and the process 550 may finish.

If, however, data from a specified register is required by the instruction, then a determination may be made at step 560 of whether data for the instruction is available via a hot forward. If data for the instruction is available via a hot forward, then the data from the hot forward may be used to execute the instruction at step 562. If data for the instruction is not available via a hot forward, then a determination may be made at step 564 of whether the data from the specified register is available via a warm forward. If the data is available via a warm forward, then the data from the warm forward may be used to execute the instruction at step 566.

If the data for the instruction is not available via the hot forward or the warm forward, then a determination may be made at step 568 of whether the data from the specified register is available via a target delay queue 330 (e.g., a cold forward). If the data is available from the target delay queue 330, then the data from the target delay queue 330 may be used to execute the instruction at step 570. If, however, the data is not available from a target delay queue 330, then at step 572 data from the specified register may be used to execute the instruction.

Thus, as described above, the hot forward and warm forward paths may provide alternative paths in the processor 110 for moving data between pipelines 310. Also, in one embodiment, within three cycles of register data being modified, the register data may be placed in a target delay queue 330. Thus, in one embodiment, because execution in each pipeline execution unit 310 may be delayed with respect to each other pipeline execution unit 310 by at least one clock cycle for a common issue group, hot forward paths and warm forward paths may only be provided between a given pipeline execution unit 310 and itself or other pipeline execution units 310 which have a delay in execution of less than two cycles with respect to the source pipeline execution unit 310. Therefore, the number of forwarding paths in the processor 110 may be reduced, thereby valuable conserving space within the processor 110.

In one embodiment, to further limit the number of forwarding paths within a processor 110, the types of forwarding paths available for a given type of source register designation (e.g., the RA register designation and/or the RB register designation, as described above with respect to FIG. 4) may be limited. For example, in one embodiment, hot forwarding may only be provided for RA source register designations and not for RB source register designations, while warm forwarding may be provided for both RA and RB source register designations. Furthermore, in one embodiment, where hot forwarding is needed for an RB source register designation and not an RA source register designation, the RA and RB source register designations may be swapped, allowing the data for the designated RB source register to be forwarded within one clock cycle. Thus, in some cases, where RA and RB source register hot forwarding is not simultaneously required (which may, for example, be a rare occurrence), the number of forwarding paths may be reduced by only providing hot forwarding paths for a single type of source register designation.

In one embodiment, data for a specified register which is being forwarded may also be modified. For example, in one embodiment, data provided via a warm forward may be complemented (e.g., the bits of a number being forwarded may be inverted). Furthermore, in one embodiment, the complement may only be available for a single source register designation such as the RB source register designation. In some cases, by providing the complement for RB source register data via a warm forward, the complemented register data may be used for subtraction. For example, a subtraction instruction may take data from a source register identified by the RA designation and subtract data from a source register identified by the RB designation. By providing the complement of the designated RB source register data, the complemented data may be added to the designated RA source register data to subtract the designated RB data from the designated RA data.

Figure 6:
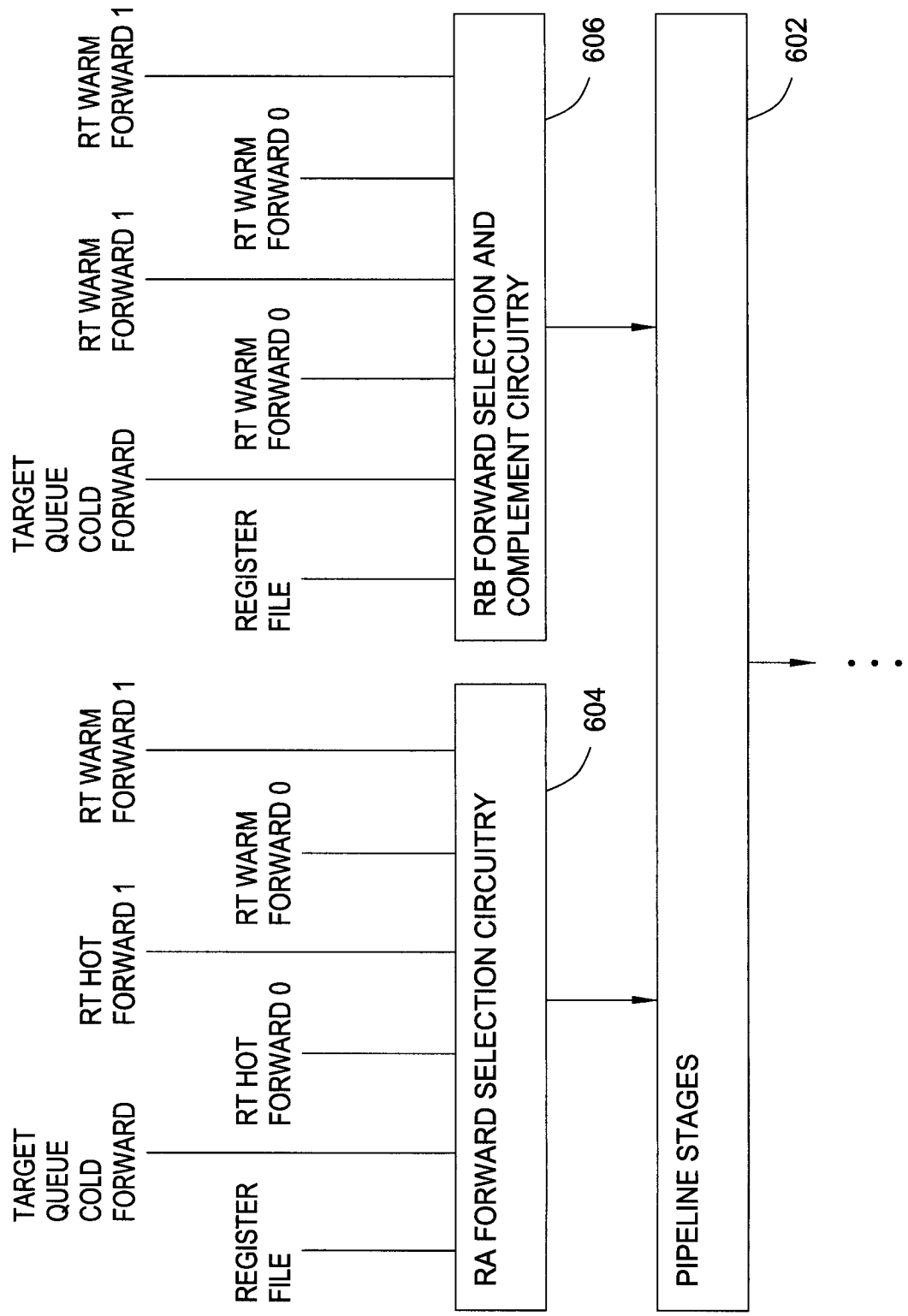
FIG. 6 is a block diagram depicting circuitry for selecting register data according to one embodiment of the invention.

FIG. 6 is a block diagram depicting circuitry for selecting register data according to one embodiment of the invention. As depicted, the circuitry may be configured to select forwarded data for an RA register designation (where provided) using RA forward selection circuitry 604 and for an RB register designation (where provided) using RB forward selection and complement circuitry 606. The selected register data may then be provided to one or more pipeline stages 602 which may use the selected register data to perform arithmetic operations, memory access operations, and/or other operations. As described above, in some cases, the depicted selection circuitry may use data from the predecoder and scheduler 220 to determine which data (e.g., from the register file 240, a target queue 330, or one of the forwarding paths) to use. For example, the predecoder and scheduler 220 may determine that a second instruction uses data from a first instruction, and provide predecoded bits indicating that register results for the first instruction should be forwarded to the second instruction.

As depicted, the RA forward selection circuitry 604 may be configured to select data from the register file 240, from a target queue 330, from one of a plurality of hot forwards, and from one of a plurality of warm forwards. In some cases, the hot forwards and warm forwards may provide data from the same pipeline stages 602 in the pipeline execution units 310 receiving the forwarded data or from other pipeline execution units 310. Similarly, the RA forward selection circuitry 606 may be configured to select data from the register file 240, from a target queue 330, and from one of a plurality of warm forwards. In some cases, the warm forwards may also provide data from the same pipeline stages 602 in the pipeline execution units 310 receiving the forwarded data or from other pipeline execution units 310. Also, as described above, in some cases, the register data designated by the RB source register designation may be complemented by the RB forward selection and complement circuitry 606.

Figure 7:
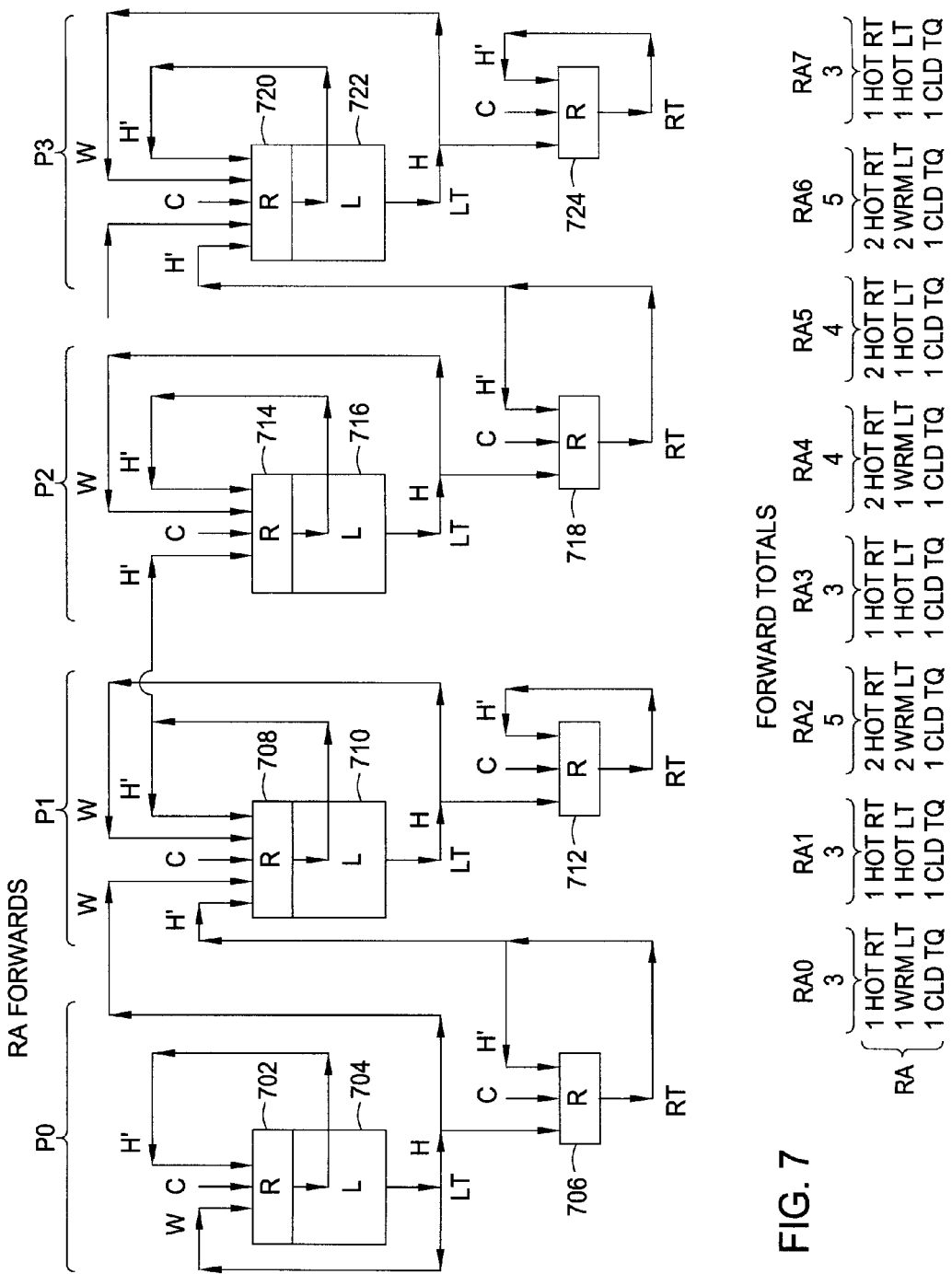
FIG. 7 is a block diagram depicting exemplary forwarding paths for a first source register designation according to one embodiment of the invention.

FIG. 7 is a block diagram depicting exemplary forwarding paths for an RA source register designation according to one embodiment of the invention. As depicted, each pipeline may include multiple pipeline stages including register access and arithmetic logic stages (designated by R) and load/store stages (designated by L). The R stages 702, 706, 708, 712, 714 718, 720, 724 may be used for loading data from and storing data to registers, as well as for performing arithmetic operations on the data being loaded and stored. The register data output from the R stages 702, 706, 708, 712, 714 718, 720, 724 may be referred to as a register target, or RT. The L stages 704, 710, 716, 722 may be used to load data from memory into registers and store data from registers into memory. Register data output from the L stages 704, 710, 716, 722 may be referred to as load targets, or LT. Also, as depicted, some R stages and L stages may be paired together (e.g., as depicted with respect to R stage 702 and L stage 704) to provide functionality such as retrieving register data and using the retrieved data to calculate an effective address and load data from the effective address.

As described above, a variety of different types of forwarding paths may be provided for RA source register designations. The forwarding paths may include hot forwards for RT results, and both warm and hot forwards for LT results. Each R stage may also be configured to receive data via a cold forward from a target delay queue 330. Furthermore, as depicted, the number and length of forwarding paths between different pipelines P0, P1, P2 and P3 may be reduced. For example, between each pipeline (e.g., pipelines P0 and P1), no more than two forwarding paths for a given source register designation may be provided (e.g., a single hot forward and a single warm forward). Also, as depicted, in some cases, hot and/or warm forwards may be provided between stages of a single pipeline (e.g., stages 702, 704, 706 of pipeline P0).

Figure 8:
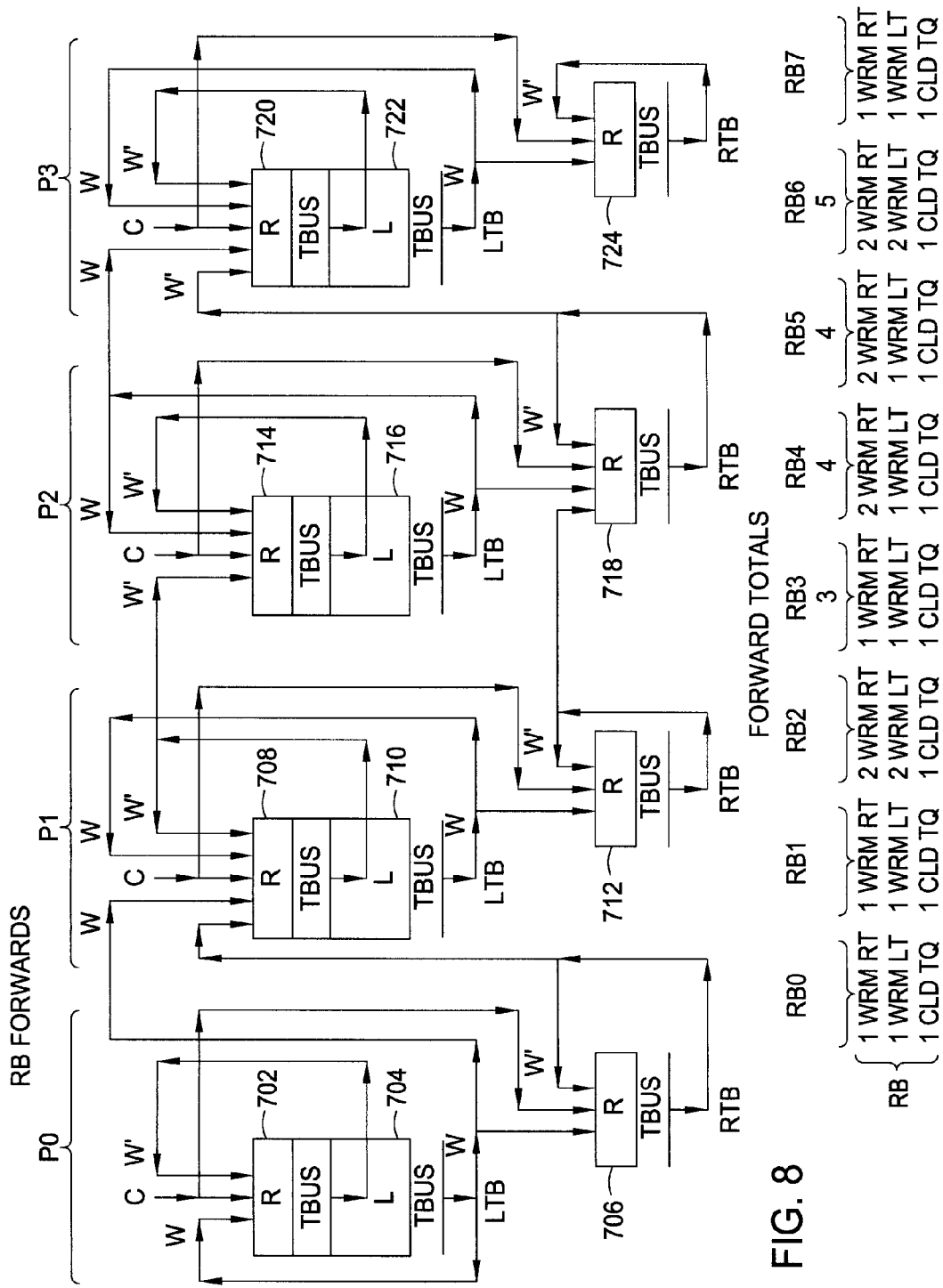
FIG. 8 is a block diagram depicting exemplary forwarding paths for a second source register designation according to one embodiment of the invention.

FIG. 8 is a block diagram depicting exemplary forwarding paths for the RB source register designation according to one embodiment of the invention. As described above, forwarding paths for the RB source register designation may be limited to warm forwards. As depicted, RB warm forwards may be provided for register results from R stages 702, 706, 708, 712, 714 718, 720, 724 as well as register results from L stages 704, 710, 716, 722. Furthermore, as depicted, in one embodiment, the number of forwarding paths between each different pipeline P0, P1, P2 and P3 may be limited to no more than two.

Target Delay Queue

Where the processor core contains multiple delayed execution pipelines, instructions issued simultaneously to the processor core in a group may be executed in a delayed manner with respect to one another, as described in FIG. 3. Each instruction which requires register data uses an operand (e.g., RA or RB) which identifies the register from which data is requested (e.g., R1, R2, R3, etc.), as illustrated in FIG. 4. The results of one or more instructions may be calculated and/or received while the other instructions are still being executed. In many instances, the execution of some instruction may depend on the results of one or more previous instructions.

Figure 9:
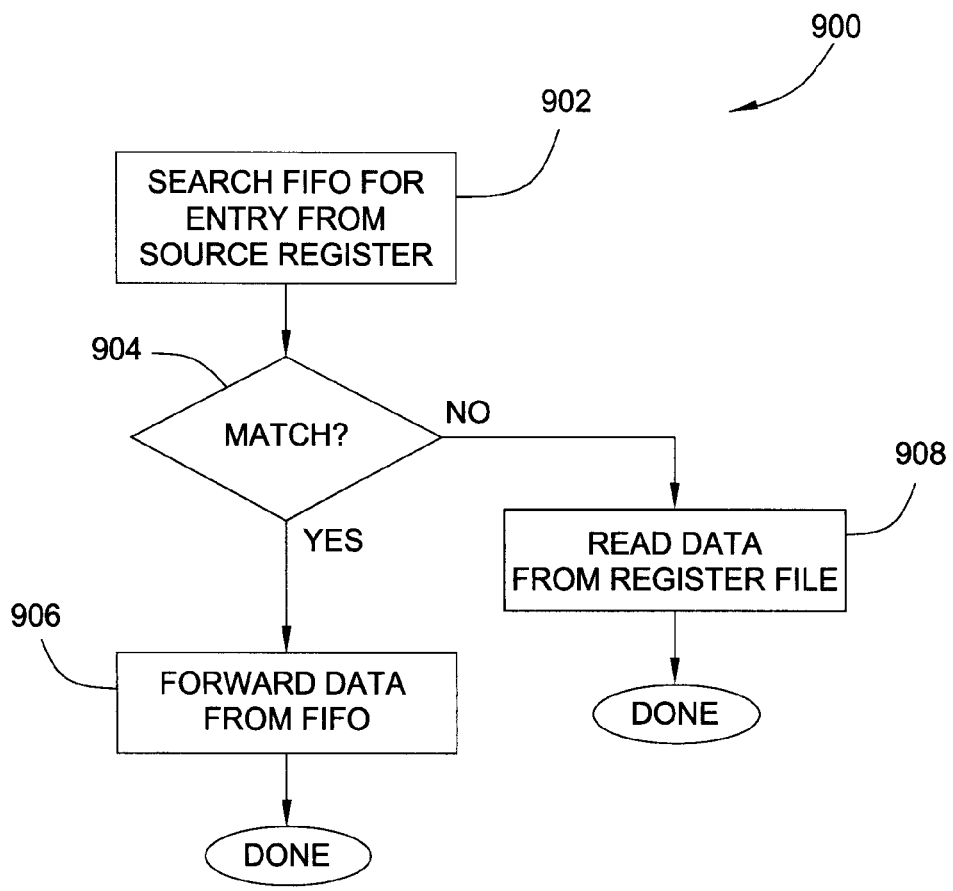
FIG. 9 is a flow diagram illustrating a process 900 for retrieving data as necessary for execution of an instruction in a processor containing multiple pipelines.

FIG. 9 is a flow diagram illustrating a process 900 for retrieving data as necessary for execution of an instruction in a processor containing multiple pipelines. Where an instruction requires data from a register, the one or more TDQs may be searched to determine whether the required data is located in the TDQs, as shown at 902. At 904, the results of the TDQ search are evaluated to determine if an entry in the one or more TDQs matches the register file data. The register data in the one or more TDQs may be newer than the data in the register file and, in some cases, older than register data which is provided via hot and warm forwarding. Thus, before an instruction is executed with data from the register file, each TDQ may be searched to determine if a recently updated version of the desired register data is located in the one or more TDQs. If the one or more TDQs contain register data, the register data may be forwarded from the one or more TDQs to priority selection logic 1120, as shown at 906. However, if the desired register data is not located in the one or more TDQs, the register data may be read from the register file.

Embodiments of the present invention provide target delay queues (TDQs) which may be used to store the results of executed instructions from each pipeline (e.g., results that will eventually be placed in a register file). Any suitable structure may be used as target delay queues, such as shift register latches (SRLs). The physical space and power necessary to implement TDQ structures using SR latches, however, may pose difficulties, particularly for deep (and wide) pipeline structures many stages or "ranks" of results to store.

Accordingly, some embodiments of the present invention may employ one or more first-in first-out FIFO arrays as target delay queues. FIFO arrays are typically more compact circuit elements. By limiting the number of forwards allowed from any one TDQ, FIFO arrays with a relatively small number of ports may be able to store and forward results in the cascaded delay execution units proposed herein.

Figure 10:
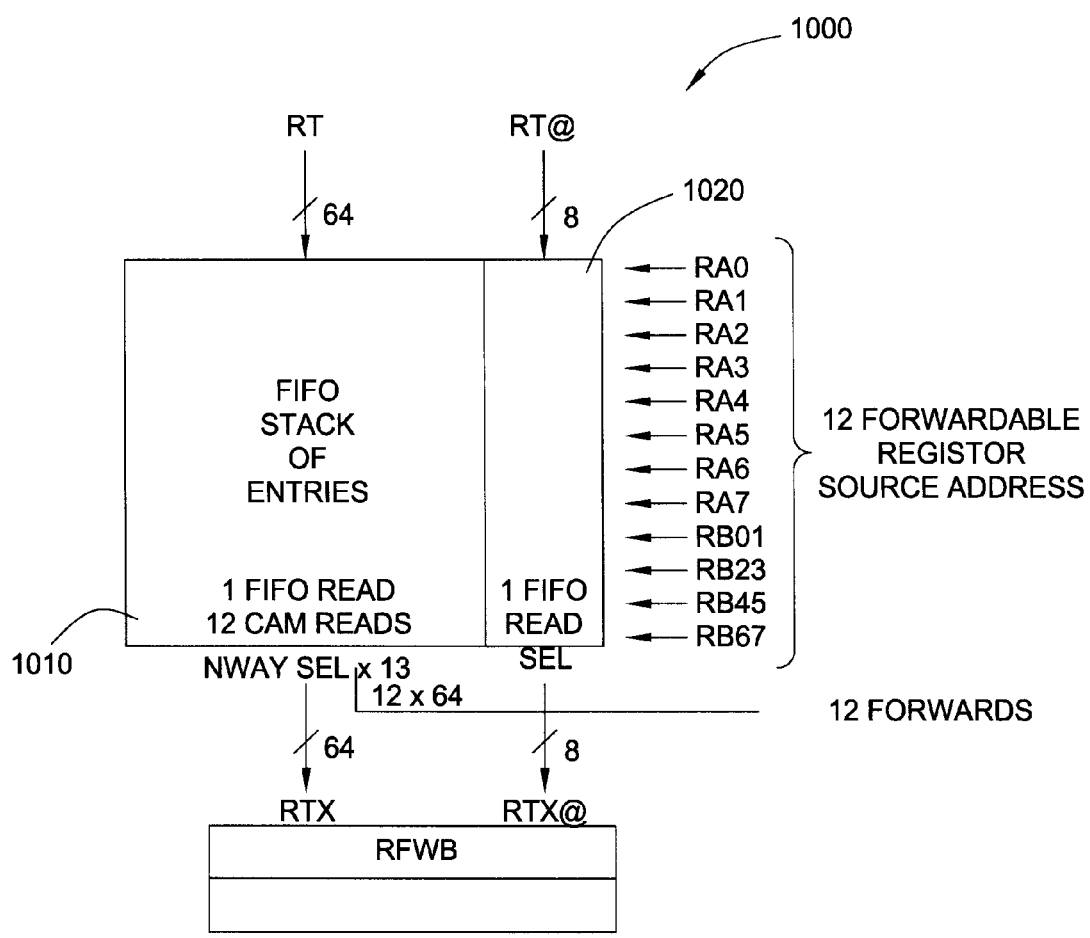
FIG. 10 illustrates a FIFO array according to one embodiment of the present invention.
Figure 11:
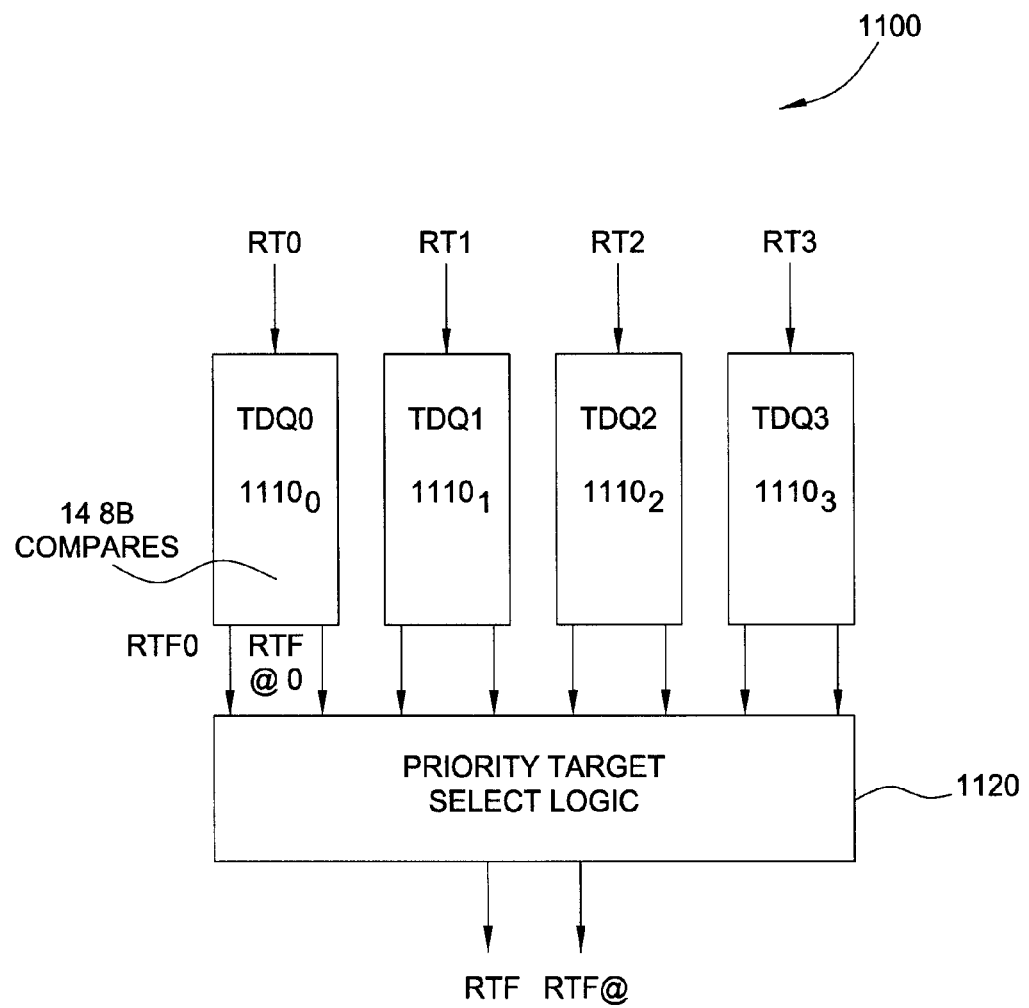
FIG. 11 illustrates a priority target select logic connected to multiple FIFOs according to one embodiment of the present invention.

FIG. 10 illustrates a FIFO array according to one embodiment of the present invention. Each of the one or more FIFO arrays may contain content addressable memory (CAM) 1020 with one or more entries that directly corresponds to register data entries 1010 found within the FIFO array. Accordingly, the instruction operand identifying a requested register may be applied to each of the one or more FIFO arrays to determine which of the FIFO arrays (if any) has the most recently updated version of the requested register data. Also, the one or more FIFO arrays may have two ports per pipeline to provide forwards for both RA and RB operands.

Because results from the most recently executed instructions are placed highest in each FIFO (e.g., closest to the portion of the pipeline performing the execution), the highest rank containing the requested register has the register data which may be used (e.g., the most recently updated).

Once the highest rank is identified, priority target select logic 1120 may determine whether multiple FIFOs $1110_{0-3}$ contain the same register data in the same (highest) rank. In some embodiments, MUXes may be used to select the most recently updated data from the FIFOs $1110_{0-3}$ in an appropriate manner (e.g., uppermost and rightmost). Where multiple FIFOs $1110_{0-3}$ contain the same register data in the highest rank, the register data may be forwarded from the FIFO which receives register data from the most delayed execution pipeline. In other words, register data in a given rank from the most delayed execution pipeline is the most recently updated, and should therefore be used. For example, where the least delayed pipeline is located to the left side of a core and the most delayed pipeline is located to the right side of a core, the register data may be forwarded from the rightmost FIFO which also has the data in the uppermost rank with respect to other FIFOs.

Because multiple instructions being executed by different stages in the delayed execution pipelines may require register data, a port may be provided on each FIFO for each stage in the pipelines which requires forwarding. Each provided port on a FIFO array may be used to search for multiple requested register data entries in the FIFO array simultaneously (e.g., one search on each port by each stage in the pipelines requiring the data). The one or more FIFO arrays may also provide a sufficient number of output ports (one for each stage requiring register data) which may be used to forward the most recent register data from the appropriate FIFO array (e.g., the FIFO with the most recently updated data) to the stage requiring the data.

CONCLUSION

While the foregoing is directed to embodiments of the present invention, other and further embodiments of the invention may be devised without departing from the basic scope thereof, and the scope thereof is determined by the claims that follow.

What is claimed is:

1. A processor, comprising:
   at least one cascaded delayed execution pipeline unit having at least first second, and third pipelines that execute first, second, and third instructions, respectively, in a delayed manner relative to each other;
   at least first and second first-in first-out target delay queue (TDQs) in which results from the execution of instructions in the first and second pipelines are stored;
   priority logic configured to assign a priority to copies of source data for the third instruction based, at least in part, on the respective locations of the copies in the TDQs; and
   forwarding circuitry configured to:
   determine if the first and second TDQs each contain copies of source data for the third instruction; and
   if so:
   select one of the copies based on a respective priority assigned by the priority logic; and
   forward the selected copy of the source data from the target delay queue to an execution unit of the second or third pipeline, respectively.

2. The processor of claim 1, wherein the first TDQ is capable of forwarding results to an execution unit of the second pipeline.

3. The processor of claim 1, wherein the priority logic is configured to assign a priority to copies of the source data based, at least in part, on which pipeline the corresponding TDQ is in.

4. The processor of claim 1, wherein:
   the cascaded delayed execution pipeline unit has at least a fourth pipeline; and
   the forwarding logic is further configured to determine if the first or second target delay queues contain source data for executing a fourth instruction assigned to the fourth pipeline and, if so, forward the source data for the fourth instruction from the target delay queue to an execution unit of the fourth pipeline.

5. A method of forwarding data in a processor, comprising:
   providing at least one cascaded delayed execution pipeline unit having at least first, second, and third pipelines that execute first, second, and third instructions, respectively, in a delayed manner relative to each other;
   storing results from the execution of instructions in the first and second pipelines in at least first and second first-in first-out target delay queue (TDQs), respectively; and assigning a priority to copies of source data for the third instruction based, at least in part, on the respective locations of the copies in the TDQs; and determining if the first and second TDQs each contain copies of source data for the third instruction; and if so:

selecting one of the copies based on a respective priority assigned by the priority logic; and forwarding the selected copy of the source data from the target delay queue to an execution unit of the second or third pipeline, respectively.

* * * * *